(12) United States Patent  
Anslow et al.

(10) Patent No.: US 6,433,899 B1
(45) Date of Patent: Aug. 13, 2002

(54) EYE QUALITY MONITOR FOR A 2R REGENERATOR

(75) Inventors: Peter Jeremy Anslow, Bishop's Stortford (GB); Richard Achille Habel; Alan Glen Solheim, both of Kanata (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/210,812

(22) Filed: Dec. 15, 1998

(30) Foreign Application Priority Data

Oct. 6, 1998 (CA) ............................................. 2249800

(51) Int. Cl.$^7$ ............................................. H04B 10/00
(52) U.S. Cl. ..................................................... 359/110
(58) Field of Search ........................ 359/177, 174–176, 359/110; 370/243, 246; 375/213, 214; 379/4

(56) References Cited

U.S. PATENT DOCUMENTS

| | | | |
|---|---|---|---|
| 4,823,360 A | | 4/1989 | Tremblay et al. ............... 375/4 |
| 5,051,993 A | * | 9/1991 | DeLuca ....................... 370/112 |
| 5,774,242 A | * | 6/1998 | O'Sullivan .................. 359/110 |
| 6,166,850 A | * | 12/2000 | Roberts ....................... 359/341 |
| 6,304,357 B1 | * | 10/2001 | Ohhata ......................... 359/194 |

FOREIGN PATENT DOCUMENTS

| | | | | |
|---|---|---|---|---|
| JP | 357171868 A | * | 10/1982 | |
| JP | 361026349 A | * | 2/1986 | ................. 375/316 |
| JP | 403080635 A | * | 4/1991 | ................. 359/156 |
| JP | 407296514 | * | 11/1995 | |

OTHER PUBLICATIONS

Saleh, A.M. "Effects of semiconductor–optical–amplifier nonlinearity on the performance of high–speed intensity–modulation lightwave systems," IEEE 1990.*

* cited by examiner

*Primary Examiner*—Jason Chan
*Assistant Examiner*—Agustin Bello
(74) *Attorney, Agent, or Firm*—Foley & Lardner (57) ABSTRACT

The method of monitoring the quality of an optical signal at the site of a 2R or 1R regenerator, without performing a clock recovery operation, is based on slicing the recovered voltage with a threshold voltage, manipulated according to a pattern, and averaging the output of the slicer. An eye diagram is simulated by a diagram representing the average voltage versus the threshold voltage.

13 Claims, 7 Drawing Sheets

EYE QUALITY MONITOR FOR A 2R REGENERATOR

BACKGROUND OF THE INVENTION

FIELD OF THE INVENTION

The invention is directed to monitoring the quality of a signal received over an optical network, and in particular, to an eye quality monitor for a data regenerator.

BACKGROUND ART

Optical signals suffer between the transmitter and receiver from two principally different groups of degradations that will cause bit errors: noise and distortion. The causes, behavior and remedies for these groups are different. The primary sources of noise are the receiver noise (i.e. shot, thermal), optical bandwidth, interferometric cross-talk, laser noise, reflections, etc.

Distortion is defined as any inaccurate replication of a signal transmitted over a communication link, and could be referred to any network element (NE) along the link. The pulse distortion in a fiber optic system may, for example, be caused by some parts of the light pulses following longer paths (modes) than other parts. The primary sources for distortion are chromatic dispersion, inter-symbol interference, non-linearity of the elements and transmission medium, receiver frequency response, etc. In addition, in amplified wavelength division multiplexed (WDM) systems, the transmission characteristics vary from one channel to another due to the non-flat gain and noise profile of erbium-doped fiber amplifiers (EDFAs). Distortion can be measured by assessing the difference between the wave shape of the original signal and that of the signal at the network element of interest, after it has traversed the transmission link.

In the last decade, the transmission rates of data signals have increased very rapidly, along with the demand for receivers with high sensitivity. For high rate transmission, such as rates over 10 Gb/s, the signal corruption introduced by the transmission channel is a critical parameter. Numerous methods have been proposed to overcome the difficult problem of measuring or estimating the signal quality. However, they are often based on the same basic principles, or use the same equipment, and differ mainly in how the primary measurement is analyzed.

Some signal quality monitoring methods require detection, synchronization, demultiplexing, and then some analysis of the sampled signal. Even in the best cases, the results are uncertain and it is difficult to ascertain if the monitoring method mimics the behavior of the final receiver.

Other methods are based on power monitoring of each channel. As these are averaging methods, they do not sense the pulse distortion. Moreover, the precision required in the spectral measurement is prohibitive in itself.

The extent of signal degradations may be directly measured using an eye closure diagram, which is the graphic pattern produced on an oscilloscope when the detected signal is applied to the vertical input of an oscilloscope and is synchronized with the instrument time base. Changes in the eye opening indicate intersymbol interference, amplitude irregularities, or timing problems. For a binary signal, the eye diagram has a single eye, which is open or closed to an extent determined by the signal degradation. An open eye pattern is desired.

Currently, the time base of the oscilloscope is triggered using a clock signal necessarily extracted from the transmission in order to capture the eye diagram. Consequently, a network provider cannot measure the quality of the optical signal without a clock extract circuit. This prior art method also fails to separate the eye closure due to distortion from that due to noise.

A receiver regenerates the signal presented to it by interpreting the levels of the received signal according to a decision level, defined also as threshold level, or as a slicing level. Generally, binary data regenerators are provided with a fixed threshold level selected so as to yield the best error rate at a predetermined signal power level.

When the extent of signal degradations must be assessed, the current way of doing so is to recover the clock at the site of the regenerator, thus destroying bit rate transparency. Such methods not only increase the complexity, and hence the cost of the equipment at the regenerator site, but also are dependent on the rate of the signal traveling along the link.

For example, U.S. Pat. No. 4,823,360 (Tremblay et al., issued Apr. 18, 1989 and assigned to Northern Telecom Limited) discloses a device for measuring quality of a signal travelling along an optical fiber, using eye closure. The device described in this U.S. patent provides the receiver with three threshold levels for recovering data. Two of the thresholds V1 and V2 are obtained by setting them above and below the center of the eye for a preset error rate, and the third threshold is provided in a selected relationship to the other two. If V1 and V2 are set for equal 'error' rates, then the central circuit operates near the middle of the eye and hence with a negligible true error rate.

The technique described in the '360 patent is based on recovering the signal clock, i.e. implies knowing the rate of the channel. In addition, the measurement does not give an indication as to the separate contribution of the noise and the distortion.

However, not all regenerators installed in a transmission link are provided with means for recovering the clock. From this point of view, regenerators may be classified as 1R, that only regenerate the signal, 2R that regenerate and reshape the signal, and 3R, that regenerate, reshape and retime the signal. 2R regenerators are used, for example, at sites where the transmission signal needs to be converted from one wavelength (e.g. 1.3 μm short reach) to another (e.g. a wavelength on the ITU grid suitable for dense WDM).

There is a need to measure the quality of an optical signal, while maintaining bit rate transparency, so that the measurements may be applied to signals of various rates.

SUMMARY OF THE INVENTION

It is an object of this invention to provide a method and apparatus for measuring the quality of a signal of a communication network, that alleviate totally or in part the drawbacks of the current methods and apparatuses.

It is another object of the invention to provide a method and apparatus for measuring the quality of a signal in a communication network which are bit rate transparent.

Still another object of the invention is to obtain a measurement of the quality of the optical signal, which can be used to assign the cause of errors to noise or to distortion.

According to one aspect of the invention, there is provided a method of monitoring the quality of an optical signal at a regenerator site, without performing a clock recovery operation, comprising, generating a threshold voltage $V_{TH}$ to take a plurality of values according to a pattern, applying the threshold voltage $V_{TH}$ on a first input of a slicer, and applying an input voltage $V_{in}$ on a second input of the slicer to obtain a slicer output voltage $V_S$, the input voltage $V_{in}$ being an electrical equivalent of the optical signal, for the plurality of threshold voltages, obtaining a corresponding plurality of associated parameters; and processing all the associate parameters as a function of all the threshold voltages to simulate an eye diagram of the optical signal.

According to a further aspect of the invention, there is provided an eye quality monitor for a data regenerator for providing a simulated eye diagram of an optical signal without performing a clock recovery operation, comprising a pattern generator for generating a threshold voltage $V_{TH}$ according to a pattern, a slicer, for receiving a the threshold voltage $V_{TH}$ on a first input and an input voltage $V_{in}$ on a second input, and generating a slicer output voltage $V_S$, the input voltage V being an electrical equivalent of the optical signal, an average detector for providing an associated average voltage $V_{AV}$ of the slicer output voltage $V_S$ corresponding to the a threshold voltage $V_{TH}$, and means for processing the average voltages $V_{AV}$, to simulate an eye diagram of the optical signal.

An important advantage of the present invention is that the quality of the signal can be measured with no need to recover the bit rate of the signal, which is very important in the case of 2R receivers, where the clock is not available. This results in important savings on equipment at such receivers.

Another advantage of the invention is that it can be applied to various signal rates and is independent of the technology used. Thus, the method can be applied to the existing SONET technology, and also to emerging optical transport networks (OTN).

BRIEF DESCRIPTION OF THE DRAWINGS

The foregoing and other objects, features and advantages of the invention will be apparent from the following more particular description of the preferred embodiments, as illustrated in the appended drawings, where:

FIGS. 5A to 5C show the simulated eye monitor transfer function for transmitted signals with various degrees of dispersion and noise.

DESCRIPTION OF THE PREFERRED EMBODIMENT

Figure 1:
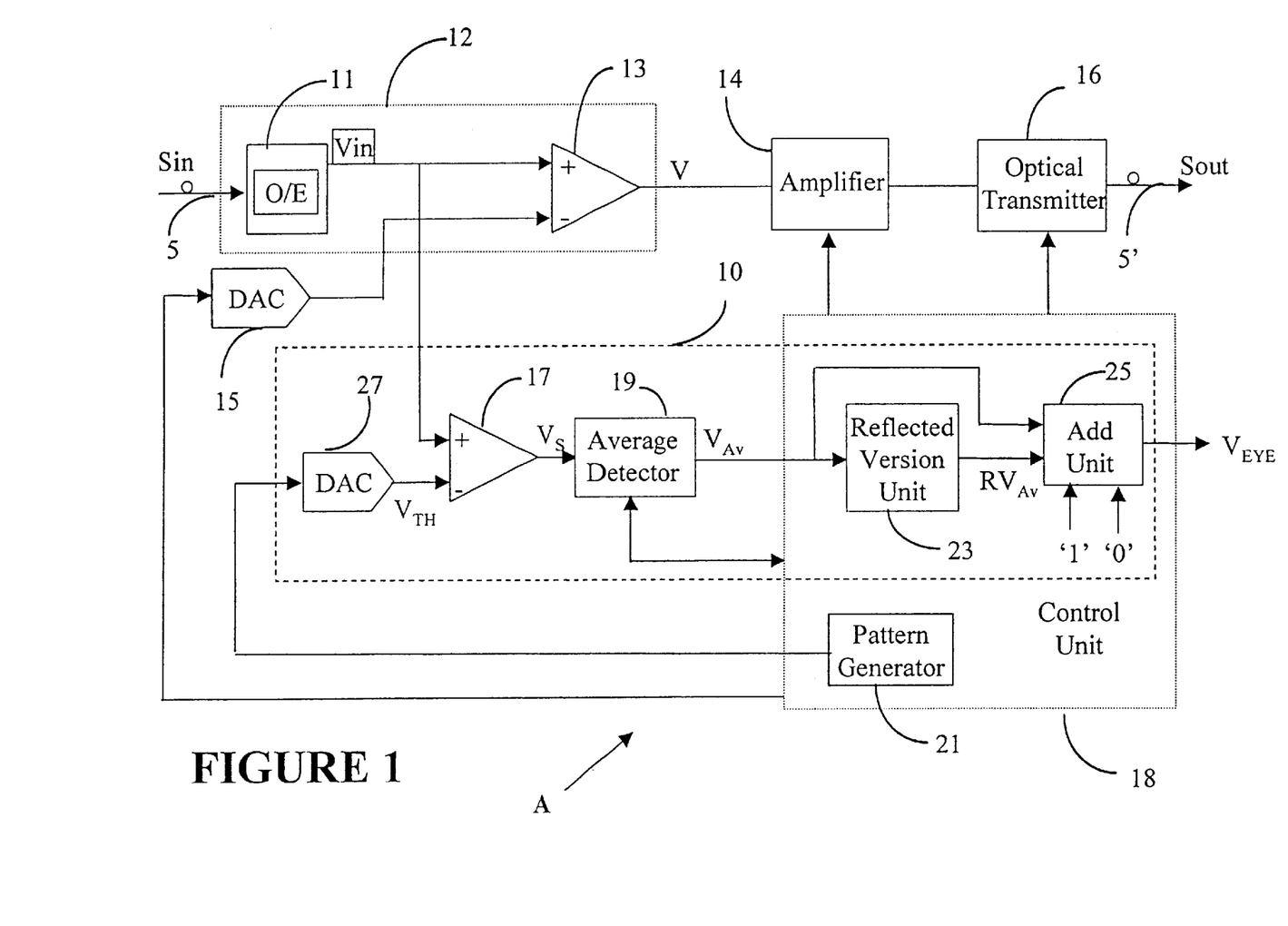
FIG. 1 shows the block diagram of a repeater site equipped with an eye quality monitor according to the invention.

FIG. 1 shows an eye monitor 10 provided at a regenerator site A for measuring the quality of the eye of an optical signal $S_{in}$. In this Figure, an incoming optical signal $S_{in}$ arrives at site A over a fiber span 5 and an outgoing optical signal $S_{out}$ leaves site A over fiber span 5'. Site A is equipped with an optical receiver 12, an amplifier 14 and an optical transmitter 16, which form a 2R regenerator, adapted only to regenerate and reshape the signal. As such, no clock recovery circuitry is provided at site A. Receiver 12 comprises an optical-to-electrical converter 11, for converting $S_{in}$ into the electrical equivalent input signal $V_{in}$. A comparator 13 compares $V_{in}$ with a decision level to separate the signal from noise. The recovered electrical signal V is then amplified in amplifier 14. Optical transmitter 16 receives the amplified variant of V, modulates it over an optical carrier and transmits the optical outgoing signal $S_{out}$ over fiber 5'.

Site A is also equipped with a control unit 18 which provides the decision level for receiver 12 and controls operation of receiver 12, amplifier 14, and transmitter 16. A digital-to-analog converter (DAC) 15 converts the slicing signal output by control unit 18 into the decision level for receiver 12.

Receiver 12, amplifier 14 and transmitter 16 are illustrated for showing the connection of the eye monitor 10.

Eye monitor 10 comprises a slicer 17 and an average detector 19. The slicer 17 receives a threshold voltage $V_{TH}$ on the negative input and input signal $V_{in}$ and on the positive input. The slicer output $V_S$ of the slicer 17 is above logic 'zero' whenever $V_{in}$ is higher than the threshold voltage $V_{TH}$.

Average detector 19 receives $V_S$ and provides the mean value $V_{AV}$ of slicer output $V_S$ over a given interval. This mean value decreases when the number and duration of pulses in $V_S$ decreases. In general, the closer $V_{TH}$ is to the maximum value of $V_{in}$, the shorter the time when $V_{in}$ is above $V_{TH}$, which results in shorter pulses for $V_S$. Shorter $V_S$ pulses means lover $V_{AV}$ values.

Figure 2A:
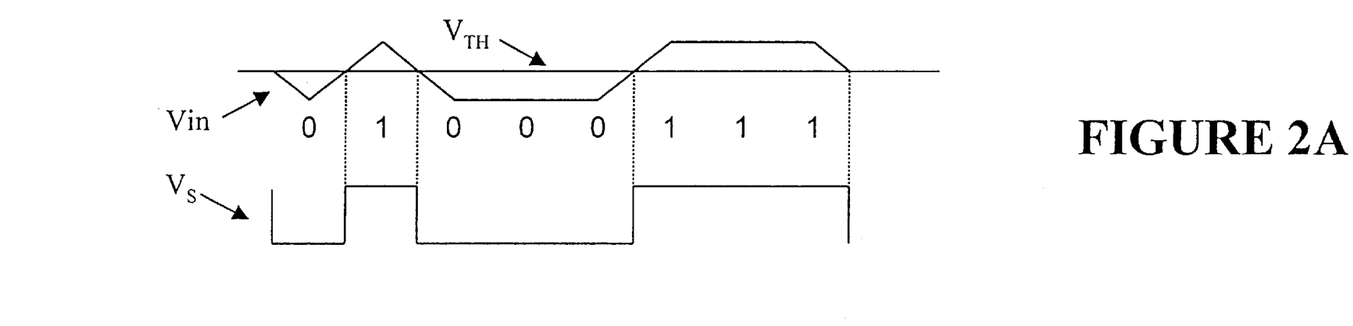
FIGS. 2A to 2C show the time diagrams for a triangular input signal applied to the eye quality monitor of FIG. 1.
Figure 2B:
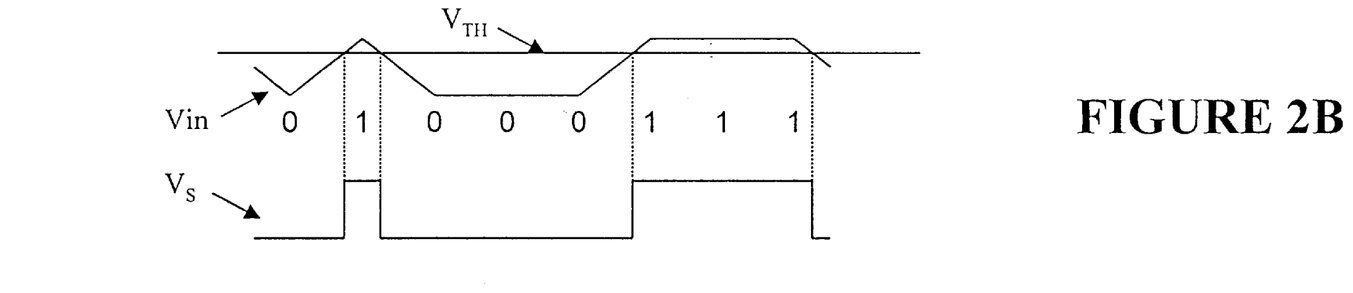
Figure 2C:
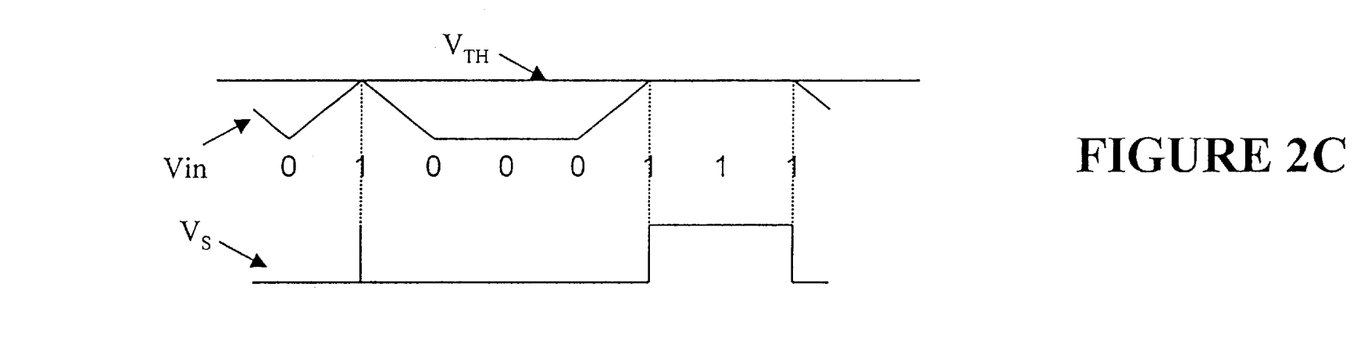
Figure 3:
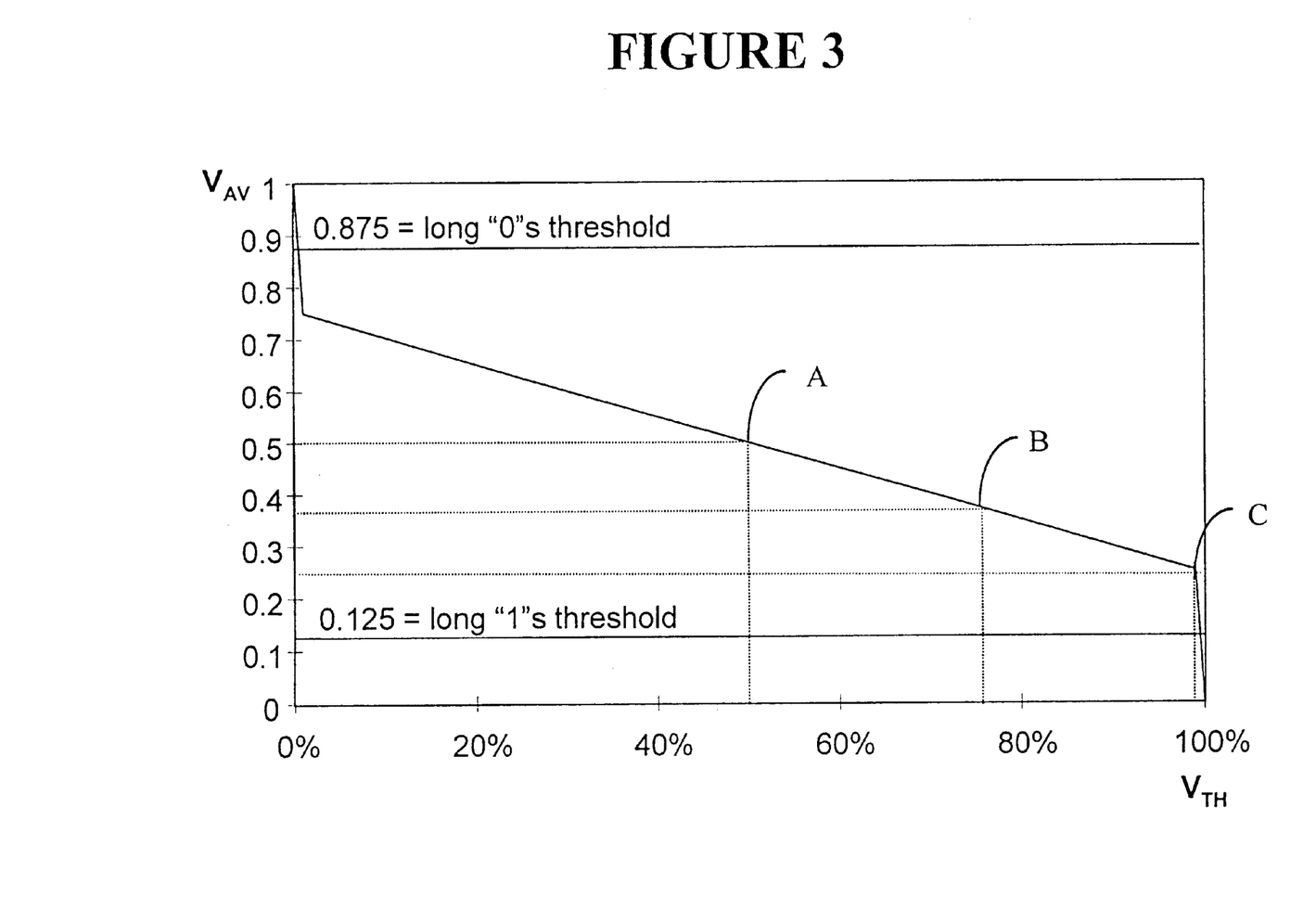
FIG. 3 shows the ideal transfer function of the eye monitor, i.e. the variation of the output voltage from the eye monitor with the threshold voltage for a triangular input signal.

FIGS. 2A to 2C show time diagrams for a triangular input signal $V_{in}$ applied to the eye quality monitor of FIG. 1, and FIG. 3 illustrates the ideal transfer function of the eye monitor, i.e. the variation of $V_{AV}$ with the threshold voltage $V_{TH}$ for a triangular input signal.

When slicing level $V_{TH}$ is at a level of 50% of the level of a logic "1", the mean value of $V_S$ is 0.5. This is shown in FIG. 2A. If the slicing level is moved up to 75% of the "1" level, the mean of $V_S$ becomes 0.375, as shown in FIG. 2B. If the slicing level is moved up to 99.9% of the "1" level, the mean of $V_S$ becomes 0.25, shown in FIG. 2C.

FIG. 3 illustrates a $V_{AV}$-$V_{TH}$ diagram for a triangular input signal. Both $V_{AV}$ and $V_{TH}$ are normalized with respect to the "1" level of $V_{in}$. A value of $V_{AV}$=0.875 is approximated for a threshold $V_{TH}$ corresponding to $V_{TH}$=0 ("long 0s threshold") and a $V_{AV}$=0.125 is approximated to a threshold corresponding to $V_{TH}$=1 ("long 1s threshold"). The points marked with A, B and C correspond to the mean values of $V_S$ in FIG. 2A, 2B and respectively 2C.

To obtain the $V_{AV}$-$V_{TH}$ diagram, the threshold voltage $V_{TH}$ is linearly swept across the entire range of the output of average detector 19, $V_{AV}$. A pattern generator 21 also shown in FIG. 1, gives various values to the threshold voltage $V_{TH}$ according to a pattern. In this example, pattern generator 21 is illustrated as being part of control unit 18, where it can be implemented in software. Pattern generator 21 may also be provided as an independent unit, so that a threshold voltage $V_{TH}$ as necessary for the invention may be obtained by any other known means.

Figure 4A:
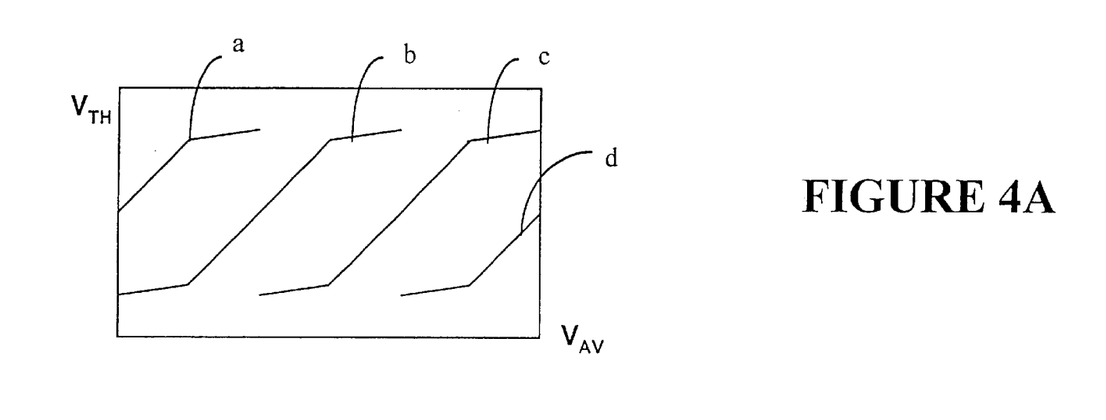
FIGS. 4A and 4B show how the eye diagram is reconstructed for a triangular input signal.

The signal at the output of block 19 is shown in FIG. 4A, illustrating diagrams a, b, c and d obtained with the same procedure of linearly increasing the threshold voltage form 0% to 100% of $V_{AV}$, and repeating this pattern. These diagrams are similar to the $V_{AV}$–$V_{TH}$ diagram shown in FIG. 3, with the abscissa and the ordinate axes interchanged, and the values of $V_{AV}$ scaled by a factor of 2. The diagrams are preferably one bit apart.

Figure 4B:
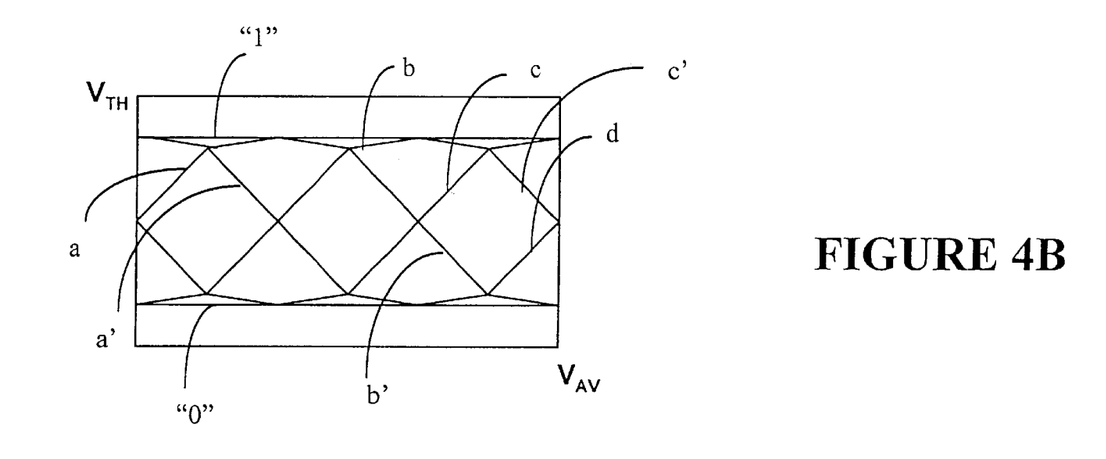

The average voltage thus obtained is input to a reflected version unit 23 that provides a variant of the average voltage, "reflected" with respect to the $V_{TH}$ axis of coordinates. This reflected variant is denoted herein with $RV_{AV}$. A succession of reflected variants is also illustrated on FIG. 4B, where diagrams denoted with a', b' and respectively c', are reflected versions of diagrams a, b and c.

To construct the eye of the signal, the output of the average detector 19 and the output of the reflected version unit 23 are added in add unit 25, together with lines "1" and "0" at 100% and at 0% respectively. The output of the add unit 25 is the reconstructed eye for $V_{in}$, which is denoted on FIG. 1 with $V_{EYE}$.

The reflected variants may be obtained in any suitable way, in software or in hardware. It is to be understood that the reflected variants may be obtained by linearly decreasing the threshold voltage $V_{TH}$ across the entire range of the average voltage $V_{AV}$, rather than calculating the reflected variants.

It is to be understood that units 23 and 25 can also be implemented as separate units, or can be implemented in control unit 18, as shown in FIG. 1. Preferably, control unit 18 is a microcontroller. A DAC 27 is also needed to convert the digital value of $V_{TH}$ into the analog value applied at the input of slicer 17.

Figure 5A:
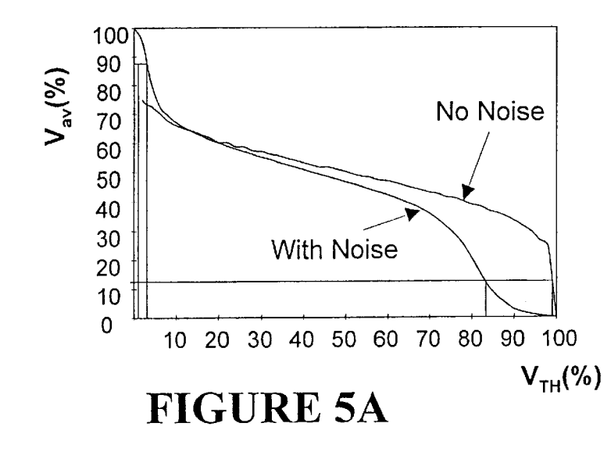
FIG. 5A refers to an undistorted signal, FIG. 5B, to a signal with eye closure due to dispersion, and FIG. 5C, to a signal with eye closure due to polarization mode dispersion (PMD)
Figure 5B:
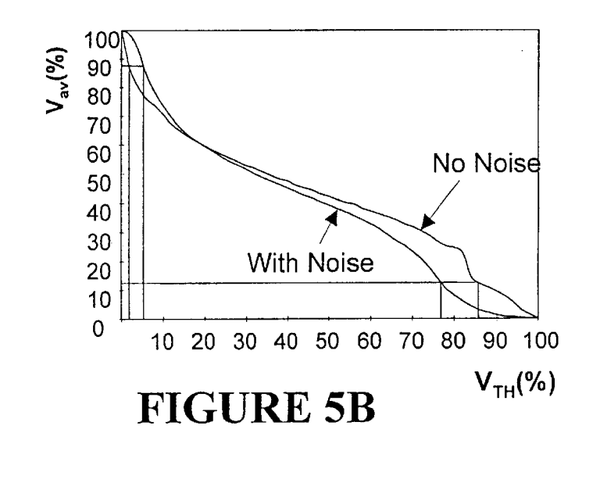
Figure 5C:
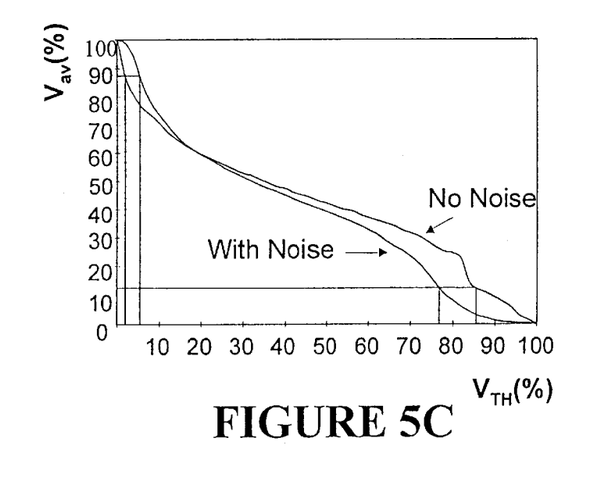

FIGS. 5A–5C shows the transfer function $V_{TH}$–$V_{AV}$ of the slicer measured with and without noise, and for input signals $V_{in}$ with various grades of distortion. The transfer functions in FIG. 5A are prepared for an undistorted of $V_{in}$. The transfer functions in FIG. 5B are for a $V_{in}$ with dispersion, and in FIG. 5C, for a $V_{in}$ with polarization mode dispersion (PMD).

Figure 6A:
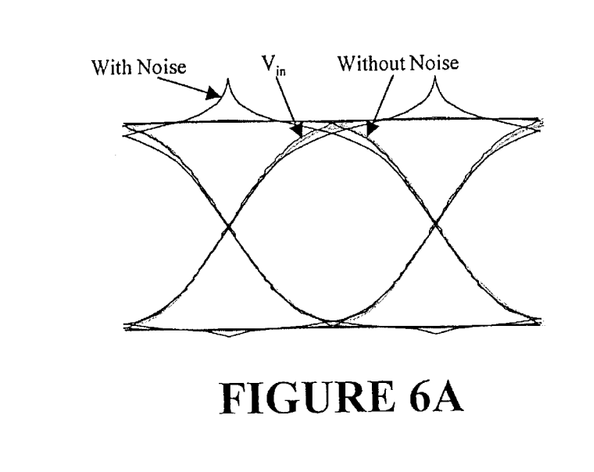
FIGS. 6A to 6C show reconstructed eye diagrams for the signals in FIGS. 5A to 5C.
Figure 6B:
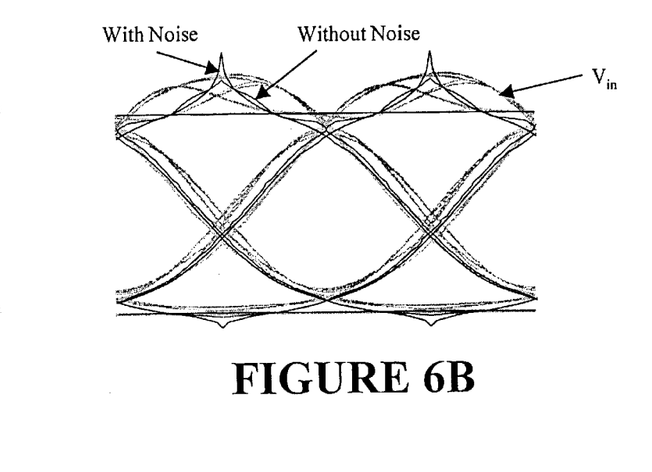
Figure 6C:
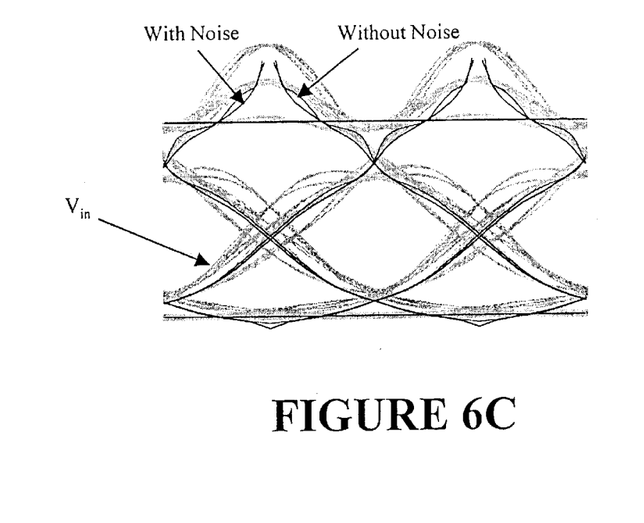

FIGS. 6A to 6C show simulated eye diagrams for the signals $V_{in}$ used for preparing the transfer characteristics of the slicer shown in FIGS. 5A to 5C, i.e. for an undistorted signal, a signal with dispersion and a signal with PMD. Superimposed on the eye diagrams for $V_{in}$ are the reconstructed eyes $V_{EYE}$ from the invention both with and without noise added to the signal $V_{in}$.

The results could be communicated by control unit 18 to the network management system, or they could be used to raise an alarm when the signal quality is under a provisioned value. This provisioned value may be any parameter defining the size of the eye.

Figures 7, 8:
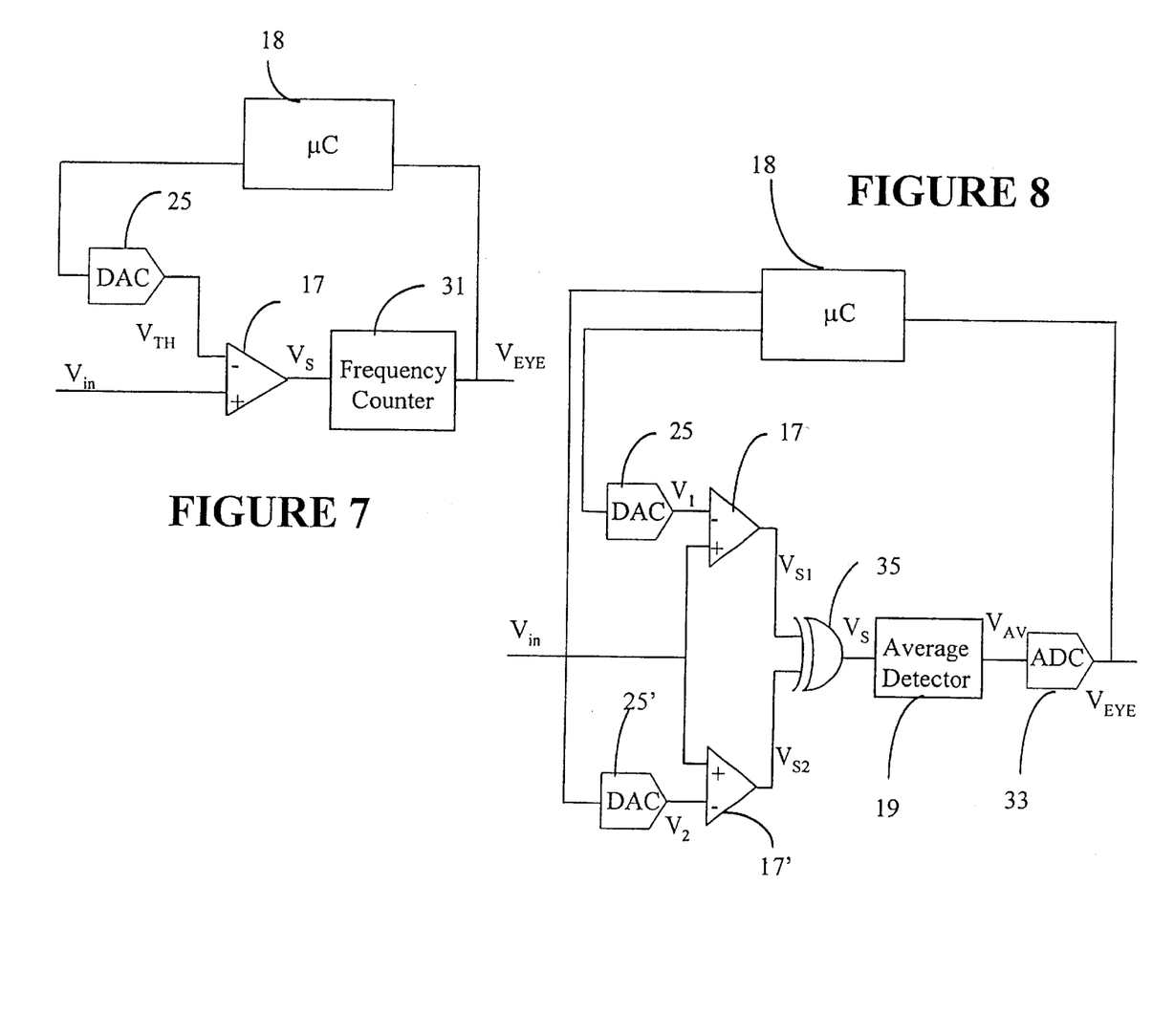
FIG. 7 is another embodiment of the eye monitor according to the invention.
FIG. 8 is still another embodiment of the eye monitor according to the invention.

Other implementations of the eye quality monitor are also possible based on similar principles, as shown in FIGS. 7 and 8.

FIG. 7 shows another embodiment of the eye monitor according to the invention. The output $V_S$ of slicer 17 is applied to a frequency counter 31, which counts the number of times $V_{in}$ rises above $V_{TH}$ in a given period. The threshold $V_{TH}$ is varied to cover the entire range of $V_{in}$, using a microcontroller shown at 18. The output of the microcontroller 18 is converted into an analog value by a DAC 25, so that $V_{TH}$ takes as many values as necessary for a given resolution. The values measured by the frequency counter 31 are provided to microcontroller 18.

As in the previous case, a transfer characteristic is plotted, this time a 'frequency count (F)'–'threshold voltage ($V_{TH}$)' diagram, by varying $V_{TH}$ for a given $V_{in}$ and measuring the corresponding values of the frequency counter 31. F is plotted in relative units with respect to the maximum value of the counter for the respective $V_{in}$. $V_{TH}$ is plotted relative to the peak-to-peak voltage.

The transfer characteristics are interpreted to determine a measure of the distortion of the eye. This method is still under investigation for determining what other parameters of $V_{in}$ may be determined on F–$V_{TH}$ diagrams.

FIG. 8 shows the block diagram of still another embodiment of the eye quality monitor according to the invention. In this embodiment, the optical incoming signal $V_{in}$ is fed to one input of slicers 17 and 17', the second input of the slicers receiving a corresponding threshold $V_1$, $V_2$. $V_1$ and $V_2$ are received from microcontroller 18 and a respective first and second DAC 25 and 25'. The output $V_{S1}$ of slicer 17 and output $V_{S2}$ of slicer 17' are fed to an exclusive OR gate 35, and the output $V_S$ of the XOR gate is averaged to obtain $V_{AV}$ in average detector 19. As is well known, the output of XOR gate 35 becomes 'logic 1' whenever one input is 'logic 1' and the other is 'logic 0', and the output is 'logic 0' whenever the inputs are both 'logic 1' or 'logic 0'.

Appropriate manipulation of thresholds $V_1$ and $V_2$ results in an average output $V_{AV}$ that estimates the probable eye shape of the optical signal with sufficient accuracy for determining the quality of transmission.

One method of exploring various aspects of the eye diagram of $V_{in}$ according to the embodiment of FIG. 8 is performed by first setting $V_1$ to a voltage above signal $V_{in}$, therefore setting one input to XOR gate 35 permanently low. Threshold $V_2$ is then set so that the output of average detector 19 $V_{AV}$ is 0.5. In other words, $V_S$ is 'logic 1' for half the time and "0" for half the time. The value measured will correspond to the '50% level' on the eye diagram.

Next, threshold $V_2$ is set to a voltage above signal $V_{in}$ and the settings for $V_1$ required for values of $V_{AV}$ of 0.125 and 0.875 are determined. The values measured correspond to the 87.5% level and the 12.5% level on the eye diagram.

$V_2$ is then returned to the value corresponding to a $V_{AV}$ of 0.5, and $V_1$ is swept between the 0.125 and 0.875 values while measuring the averaged output at each point.

An estimation of the average eye shape may now be obtained by plotting various values of the $V_1$ vs $(0.25+V_S)*2$ when $V_1 > V_2$ and $V_1$ vs $(0.25-V_{out})*2$ when $V_1 < V_2$.

Still another way of obtaining information about the eye of $V_{in}$ is to scan $V_1$ and $V_2$ through the eye with a small offset of for example 2%.

We claim:

1. A method of monitoring the quality of an optical signal at a regenerator site, without performing a clock recovery operation, comprising:

generating a threshold voltage $V_{TH}$ to take a plurality of values according to a pattern;

applying said threshold voltage $V_{TH}$ on a first input of a slicer, and applying an input voltage $V_{in}$ on a second input of said slicer to obtain a slicer output voltage $V_S$, said input voltage $V_{in}$ being an electrical equivalent of said optical signal;

for said plurality of threshold voltages, obtaining a corresponding plurality of associated parameters; and processing all said associate parameters as a function of all said without requiring input from a clock recovery operation for said processing step.

2. A method of monitoring the quality of an optical signal at a regenerator site, without performing a clock recovery operation, comprising:

generating a threshold voltage $V_{TH}$ to take a plurality of values according to a pattern;

applying said threshold voltage $V_{TH}$ on a first input of a slicer, and applying an input voltage $V_{IN}$ on a second input of said slicer to obtain a slicer output voltage $V_S$, said input voltage $V_{IN}$ being an electrical equivalent of said optical signal;

for said plurality of threshold voltages, obtaining a corresponding plurality of associated parameters; and processing all said associate parameters as a function of all said threshold without requiring input from a clock recovery operation for said processing step.

wherein said parameter is an associated average voltage providing the average value of said slicer output voltage $V_S$.

3. A method as claimed in claim 2, further comprising:

normalizing all said threshold voltages, and said associated average voltages with respect to the logic 1 level of said input voltage $V_{in}$;

plotting a $V_{AV}$-$V_{TH}$ diagram using said normalized threshold voltages and said normalized associated average voltages;

comparing said $V_{AV}$-$V_{TH}$ diagram with a reference $V_{AV}$-$V_{TH}$ diagram to distinguish the effect of the noise from the effect of the distortion on said optical signal.

4. A method as claimed in claim 2, wherein said step of generating comprises:

providing a maximum threshold voltage above the maximum value of said input voltage $V_{in}$ for obtaining a long one's value, and providing a minimum threshold voltage less than the minimum value of said input voltage $V_{in}$ for obtaining a long zero's value;

linearly increasing said threshold voltage from said minimum to said maximum threshold voltage; and repeating said step of linearly increasing at predetermined intervals.

5. A method as claimed in claim 2, wherein said step of obtaining a corresponding plurality of associated average voltages comprises determining an associated average voltage for each value assumed by said threshold voltage.

6. A method as claimed in claim 5, wherein said step of processing comprises:

providing a reflected version of each said associated average voltage to obtain a corresponding plurality of reflected versions;

normalizing each said threshold voltage, said associated average voltage and said reflected version with respect to the logic 1 level of said input voltage $V_{in}$; and for each threshold voltage, adding said normalized associated average voltage with said normalized reflected versions to obtain said simulated eye diagram.

7. A method as claimed in claim 6, further comprising:

providing a maximum threshold voltage above the maximum value of said input voltage $V_{in}$ for obtaining a long one's value, and providing a minimum threshold voltage less than the minimum value of said input voltage $V_{in}$ for obtaining a long zero's value; and adding said long zero's value and said long one's value on said simulated eye diagram.

8. A method as claimed in claim 6, wherein said step of providing a reflected version comprises:

determining a maximum of said average voltage, and determining said reflected version for said threshold voltage by ascertaining a symmetrical value for said associated average voltage with respect to said maximum average voltage.

9. A method as claimed in claim 2, wherein said threshold voltage $V_{TH}$ is generated in a digital format, is converted to an analog format, and is applied on said first input of said slicer in said analog format.

10. A method of monitoring the quality of an optical signal at a regenerator site, without performing a clock recovery operation, comprising:

generating a threshold voltage $V_{TH}$ to take a plurality of values according to a pattern;

applying said threshold voltage $V_{TH}$ on a first input of a slicer, and applying an input voltage $V_{IN}$ on a second input of said slicer to obtain a slicer output voltage $V_S$, said input voltage $V_{IN}$ being an electrical equivalent of said optical signal;

for said plurality of threshold voltages, obtaining a corresponding plurality of associated parameters; and processing all said associate parameters as a function of all said threshold without requiring input from a clock recovery operation for said processing step, wherein said associated parameter is a count indicating the interval when said input voltage is above said threshold voltage.

11. An eye quality monitor for a data regenerator for providing a simulated eye diagram of an optical signal without performing a clock recovery operation, comprising:

a pattern generator for generating a threshold voltage $V_{TH}$ according to a pattern;

a slicer, for receiving a said threshold voltage $V_{TH}$ on a first input and an input voltage $V_{in}$ on a second input, and generating a slicer output voltage $V_S$, said input voltage $V_{in}$ being an electrical equivalent of said optical signal;

an average detector for providing an associated average voltage $V_{AV}$ of said slicer output voltage $V_S$ corresponding to said a threshold voltage $V_{TH}$; and means for processing said average voltages $V_{AV}$, to simulate an without requiring input from a clock recovery operation for said processing step.

12. An eye quality monitor as claimed in claim 11, wherein said means for processing comprises:

a reflected version unit for providing a reflected version of each said associated average voltage to obtain a corresponding plurality of reflected versions; and an add unit for adding a normalized value of said associated average voltage with a normalized value of said reflected version, for each threshold voltage, to obtain said simulated eye diagram.

13. A method of monitoring the quality of an optical signal at a regenerator site, without performing a clock recovery operation, comprising:

generating a threshold voltage $V_{TH}$ to take a plurality of values according to a pattern;

applying said threshold voltage $V_{TH}$ on a first input of a slicer, and applying an input voltage $V_{IN}$ on a second input of said slicer to obtain a slicer output voltage $V_S$, said input voltage $V_{IN}$ being an electrical equivalent of said optical signal;

for said plurality of threshold voltages, obtaining a corresponding plurality of associated parameters; and processing all said associate parameters as a function of all said threshold voltages to simulate an eye diagram of said optical signal, without requiring input from a clock recovery operation for said processing step.

* * * * *